Nov. 7, 1961
A. H. JOHNSON
3,008,113
ELECTRICAL INTERCONNECTING AND MOUNTING
DEVICE FOR PRINTED-CIRCUIT BOARDS
Filed July 30, 1958
10 Sheets-Sheet 1

INVENTOR.
ALFRED H. JOHNSON
BY Donald F Voss
ATTORNEY

Nov. 7, 1961 A. H. JOHNSON 3,008,113

ELECTRICAL INTERCONNECTING AND MOUNTING DEVICE FOR PRINTED-CIRCUIT BOARDS

Filed July 30, 1958 10 Sheets-Sheet 2

Nov. 7, 1961

A. H. JOHNSON 3,008,113

ELECTRICAL INTERCONNECTING AND MOUNTING DEVICE FOR PRINTED-CIRCUIT BOARDS

Filed July 30, 1958

10 Sheets-Sheet 3

Nov. 7, 1961 A. H. JOHNSON 3,008,113

ELECTRICAL INTERCONNECTING AND MOUNTING DEVICE FOR PRINTED-CIRCUIT BOARDS

Filed July 30, 1958 10 Sheets-Sheet 7

Nov. 7, 1961 A. H. JOHNSON 3,008,113

ELECTRICAL INTERCONNECTING AND MOUNTING DEVICE FOR PRINTED-CIRCUIT BOARDS

Filed July 30, 1958 10 Sheets-Sheet 8

3,008,113
ELECTRICAL INTERCONNECTING AND MOUNTING DEVICE FOR PRINTED-CIRCUIT BOARDS

Alfred H. Johnson, Endicott, N.Y., assignor to International Business Machines Corporation, New York, N.Y., a corporation of New York Filed July 30, 1958, Ser. No. 752,038
3 Claims. (Cl. 339—17)

This invention relates to receptacles and particularly to receptacles having a plurality of contact elements for receiving a plug element of di-electric material which has a plurality of terminals thereon and, more particularly, to an assembly for permitting electrical interconnections between terminals of several plug elements and external connections to individual plug elements.

Since the advent of printed circuitry and modular electronic units, a wide variety of receptacles has been provided for interconnecting pluggable elements supporting electronic components electrically connected by printed circuits in the form of thin conductors adherent to the pluggable elements.

The modular electronic units are essentially building blocks for electronic devices such as computers and other like devices. By interconnecting the modular units in certain logical order, a complete electronic device may be effected.

The characteristics of the electronic components require that the electrical interconnections be faultless. There is a wide latitude in providing a receptacle which will function properly. One governing factor is the environment in which the receptacle will perform. If a connector is subject to violent vibrations or extreme atmospheric conditions, ample provision must be made to surmount the particular conditions which would tend to hamper proper performance.

This invention is directed to provide a receptacle which will function properly under a wide variety of types of environmental conditions.

Because of the extensive use of the receptacles for interconnecting electronic modular units, it is highly desirable to provide a receptacle which may be manufactured by automation so as to keep the cost relatively low. In this invention, the receptacle is relatively inexpensive and may be integrated into a system comprising a plurality of such receptacles for interconnecting electronic components mounted upon pluggable elements and still retain a greater degree of individuality and flexibility to permit access for servicing and modifying the size of the system.

The electrical connections between the contact elements of the receptacle and the terminals of the pluggable elements are established by mechanical pressure in this invention. The contact elements are resilient and stressed to exert a relatively high degree of pressure upon associated terminals of the pluggable elements. Since electrical resistance of the contacts is largely a function of the pressure applied thereto, it is highly desirable to have the contacts bear against the terminals with relatively high pressure so as to result in relatively low electrical resistance.

Because the contact elements are stressed to a degree to provide a relatively high contact pressure, any overstressing thereof will result in diminished contact pressure and an increase in electrical resistance; and repeated insertion and removal of the pluggable elements could result in functional failure of the contact elements. However, in this invention, the receptacle accommodates the pluggable elements so that faulty insertion does not overstress the contact elements. To further reduce the possibility of overstressing the contact elements, the pluggable elements are provided with a leading inclined surface which has a lower co-efficient of friction than the terminals. The leading inclined surface engages the contact elements first and uniformly deflects the same in small increments until they are fully deflected. The terminals of the pluggable element, therefore, do not engage the contact elements until they are fully deflected. Hence, not only are the contact elements deflected gradually, rather than being fully deflected all at once, they are being deflected while the friction forces are less because the terminals are not engaging the contact elements.

An important feature of this invention is that high contact pressure is achieved without overstressing the contact elements and without additional apparatus which would increase the cost and complexity of the receptacle.

Heretofore, receptacles for the purpose described included additional apparatus to permit the pluggable element to be inserted without pressure on the contact elements. This usually required a camming device to move the contact elements to a remote position, or the contact elements would normally be in a remote location and a camming device would cause the contacts to bear upon the terminals after the pluggable element was fully inserted. Naturally, the inclusion of such additional apparatus results in a more expensive receptacle which also becomes subject to greater maintenance.

Also, in this invention, the contact elements are anchored in the body of the receptacle to make contact with and bear against the terminals from one side only; hence, permitting the pluggable element to be rigidly supported on the opposite side. Heretofore, it had been the practice to permit the contacts to float within the body of the receptacle and to embrace the pluggable element from opposite sides. Under the latter conditions, it is likely that the contact elements will become overstressed and make faulty connections with the terminals on the pluggable element.

Since the pluggable elements are inserted under pressure, the contact elements wipe the terminals so as to remove any oxidation or foreign matter formed on the terminals or the contacts. Those devices utilizing separate means for establishing contact pressure are usually deficient in this respect or require additional apparatus for causing the contact elements to wipe the terminals.

Because, in this invention, the contact elements of the receptacle engage the pluggable element from one side only, it is highly desirable for the pluggable element to be inserted into the receptacle only in one way; i.e., so that the terminals on the pluggable element will be aligned and make electrical contact with the contact elements in the receptacle. Another feature of this invention is to eliminate the possibility of inserting a pluggable element backwards into the receptacle.

In connection with the pluggable elements, it is highly desirable to guide them during the insertion thereof into the receptacle and to maintain them separate and rigid in their inserted position. A detachable separator element, which may be easily attached to the receptacle, is provided for purposes of both guiding and separating pluggable elements and holding the free portion of the pluggable element rigid while in its fully inserted position.

Another feature of this invention is to have the terminal portion of the contact elements associated with a single pluggable element extend through the body of the receptacle so as to form two separate offset or staggered rows and thereby increase the spacing between adjacent terminal portions to facilitate any electrical connections thereto such as by wrapping wire therearound or by other like cable connections. The contact elements of the receptacle may be interconnected by thin conductors adherent to a panel element having apertures through which the terminal portion of the contacts extend. The extending portion of the contacts is given a 90-degree twist so as to mechanically hold the panel element to the base of the receptacle. In this manner, the contact elements may be electrically interconnected and also be rigidized to permit external cable connections.

As previously stated, the contact elements are anchored in the body of the receptacle. Therefore, the terminal portion of the contact elements extending from the body of the receptacle is in effect, with respect to movement, isolated from the portion of the contact elements for establishing electrical connection with the terminals of the pluggable element. This is very important, since once the contact elements establish electrical connection with the terminals upon the pluggable element, this connection should not be disturbed unintentionally; i.e., by actions other than the removal of a pluggable element. If the electrical connection is unintentionally disturbed by movement of the contact portion of the contact elements, then the contact elements would more than likely re-establish the electrical connection through adjacent surface oxides or foreign matter to result in a faulty connection. However, this will not occur in this invention, since movement of the portion of the contact elements extending from the receptacle due to vibration or servicing cannot cause movement of the contact portion of the contact elements.

It is, therefore, a prime object of this invention to provide an improved receptacle for facilitating electrical interconnections of pluggable units which have electronic components mounted thereon.

It is another object of this invention to provide an improved receptacle having stressed contact elements for establishing electrical contact with terminals of pluggable elements which prevents overstressing of the contact elements by the pluggable elements.

A further object of this invention is to provide an improved receptacle having a plurality of contact elements for establishing electrical connections with terminals upon pluggable elements in a manner so as to reduce the wearing of the terminals.

An additional object of this invention is to provide an assembly including a receptacle having contact elements for establishing electrical connections with terminals upon a pluggable element where the pluggable element has a leading inclined edge having a lower coefficient of friction than the terminals thereon so that the contact elements, upon insertion of the pluggable element, will be deflected gradually to a state of full deflection with relatively little friction before making contact with the terminals.

Still a further object of this invention is to provide an improved receptacle having a plurality of contact elements for establishing electrical connections with terminals upon a pluggable element which permits a wiping action between the contact elements and terminals during insertion and withdrawal of the pluggable elements so as to remove any corrosion or foreign matter formed on the contact elements of the terminals.

Another further object of this invention is to provide an assembly including a receptacle for receiving pluggable elements which has a separator element attached thereto for guiding the pluggable elements into the receptacle and for maintaining the non-inserted or free ends of the pluggable elements separate and rigid.

Still an additional object of this invention is to provide an assembly including a plurality of receptacles, each having a separator element attached thereto and which cooperate with each other to support the receptacles.

Yet another object of this invention is to provide an improved receptacle having a plurality of contact elements which extend from the receptacle in a uniform grid-like pattern to facilitate electrical connections therewith.

It is still a further object of this invention to provide an improved receptacle having a plurality of contact elements for establishing electrical connections with terminals upon a pluggable element where the contact elements protrude through apertures in a panel having conductors adherent thereto which electrically interconnect the contact elements.

Another object of this invention is to provide a receptacle having a plurality of contact elements adapted to protrude through apertures in a panel having conductors adherent thereto for electrically interconnecting the contact elements which are given a twist so as to mechanically hold said panel element to the receptacle and to facilitate electrical connection to the conductors by soldering.

Another object of this invention is to provide an improved receptacle having a plurality of contact elements for establishing electrical connections and a plurality of terminals of a pluggable element which may be integrated into an assembly comprising a plurality of such receptacles and still retain a degree of flexibility and individuality to permit ready access for servicing and modification of the size of the assembly.

Another object of this invention is to support a plurality of receptacles in a manner which permits easy removal of any one of the receptacles.

Other objects of the invention will be pointed out in the following description and claims and illustrated in the accompanying drawings, which disclose, by way of examples, the principle of the invention and the best mode which has been contemplated of applying that principle.

Figure 4A:
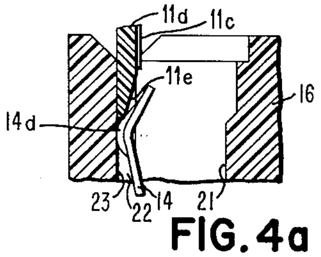
Figure 14A:
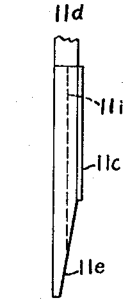
Figure 14:
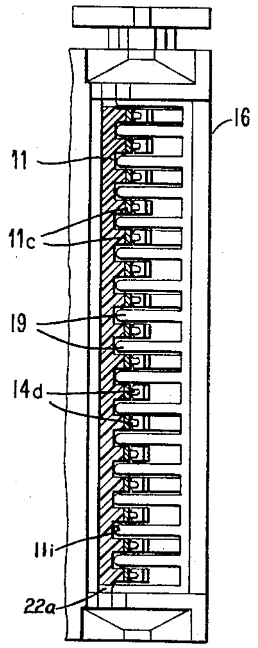
Figure 4B:
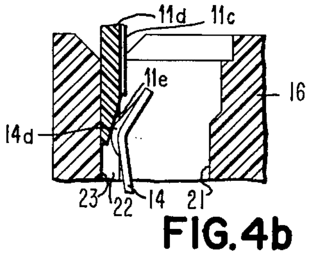
Figure 4C:
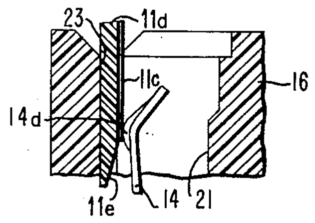
Figure 6:
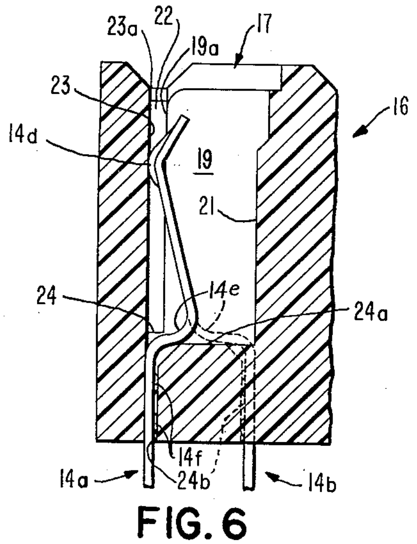
Figure 5:
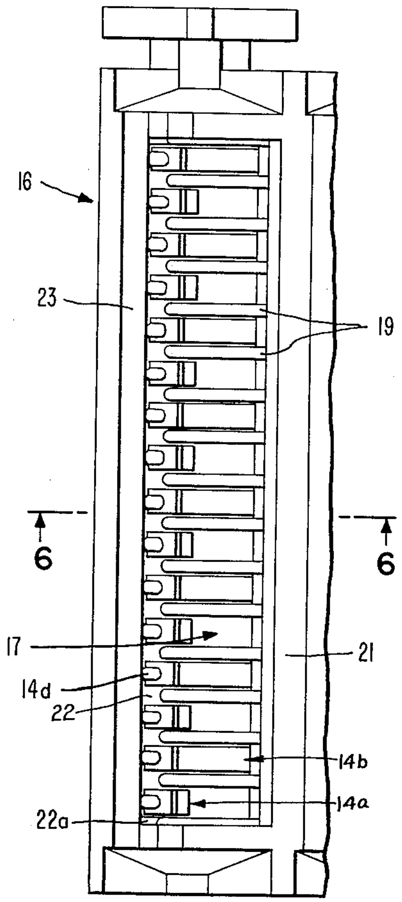
Figure 7A:
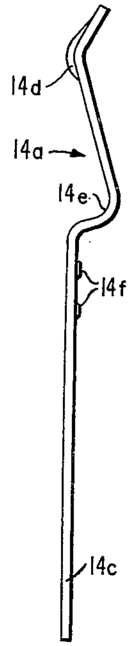
Figure 7B:
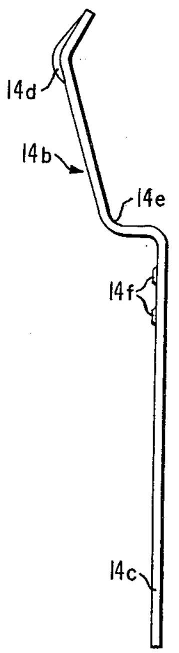
Figure 10:
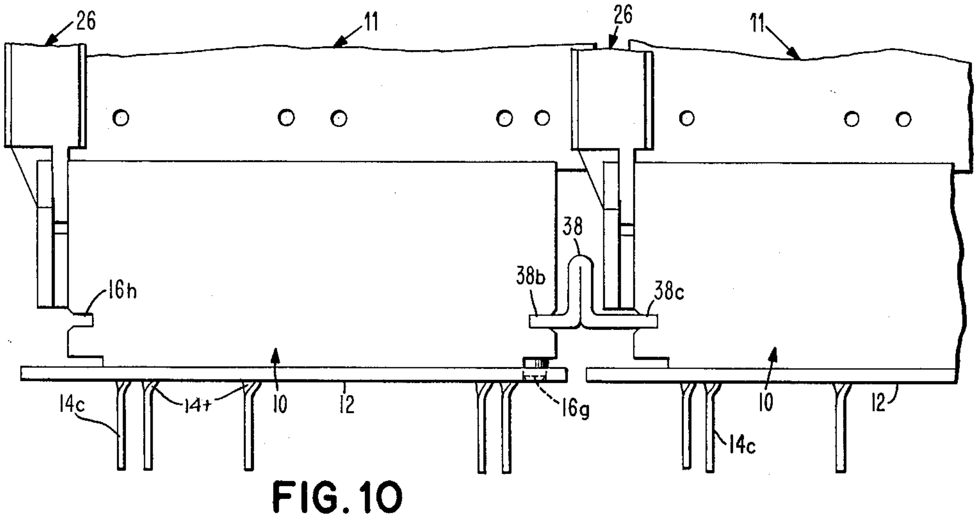
Figure 8:
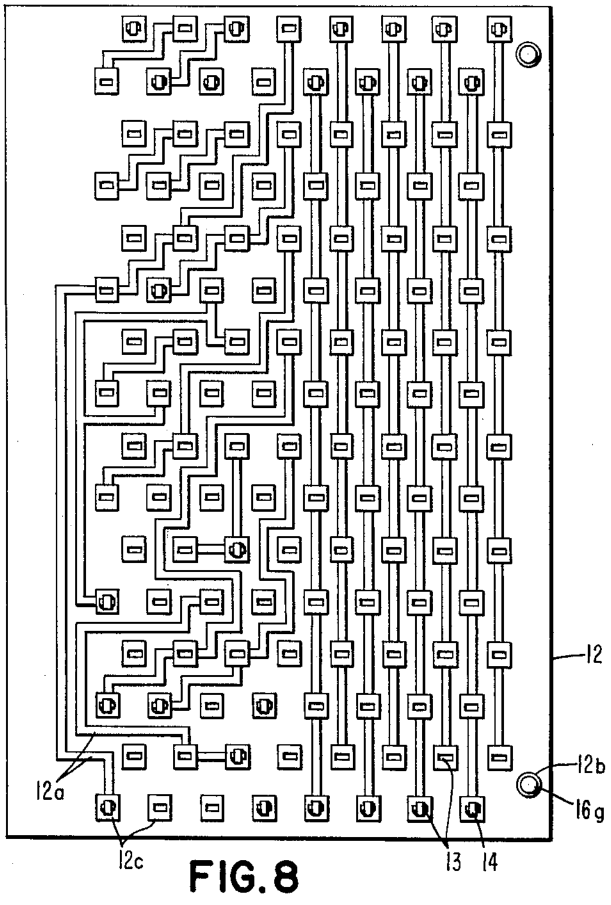
Figure 9:
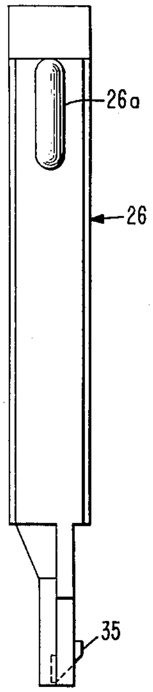
Figure 12:
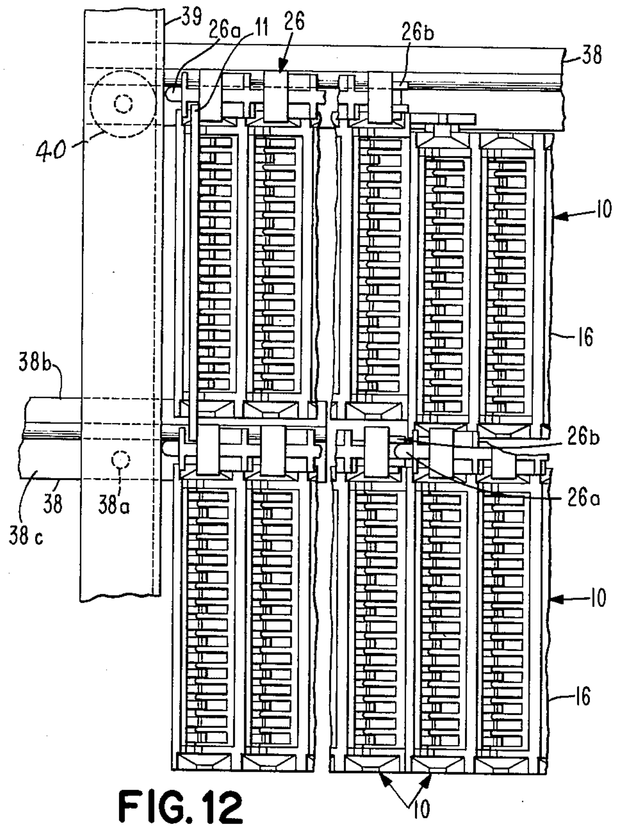
Figure 13:
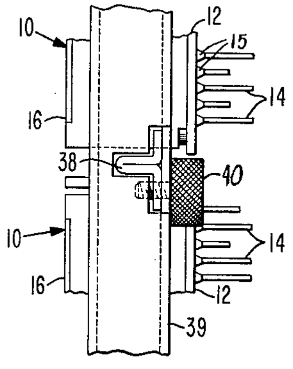
Figure 11:
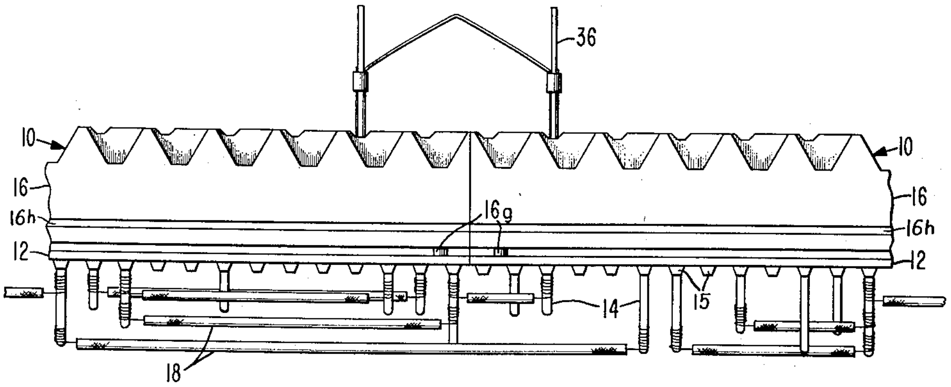
Figure 15:
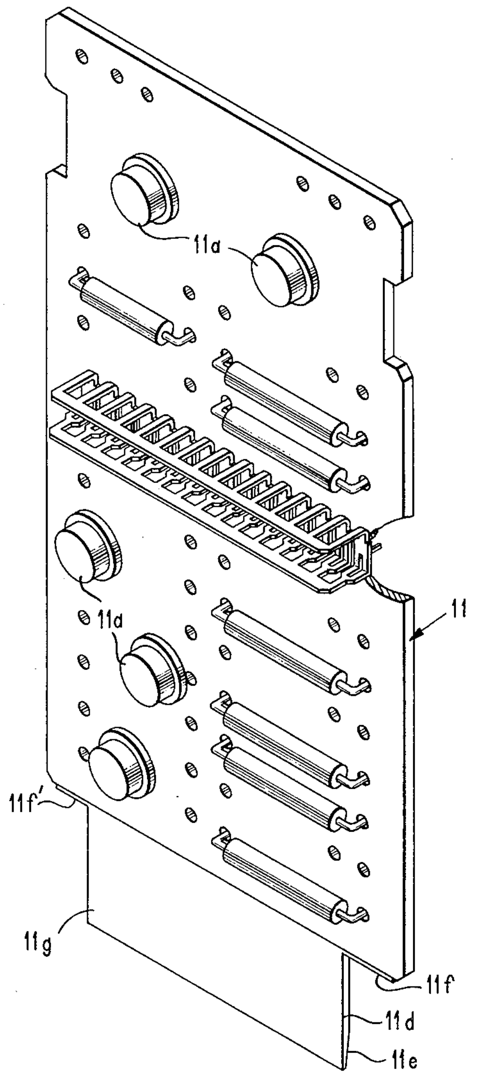
Figure 16:
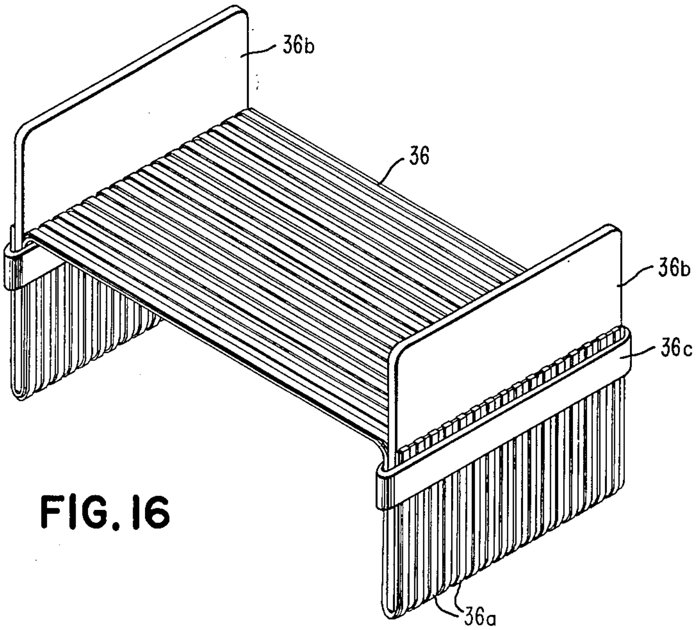
Figure 17:
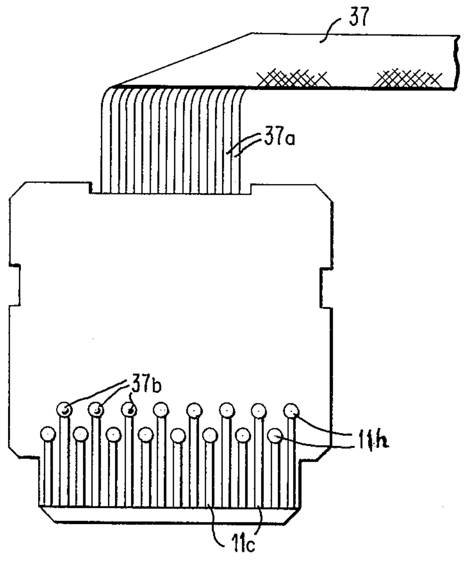
Figure 18:
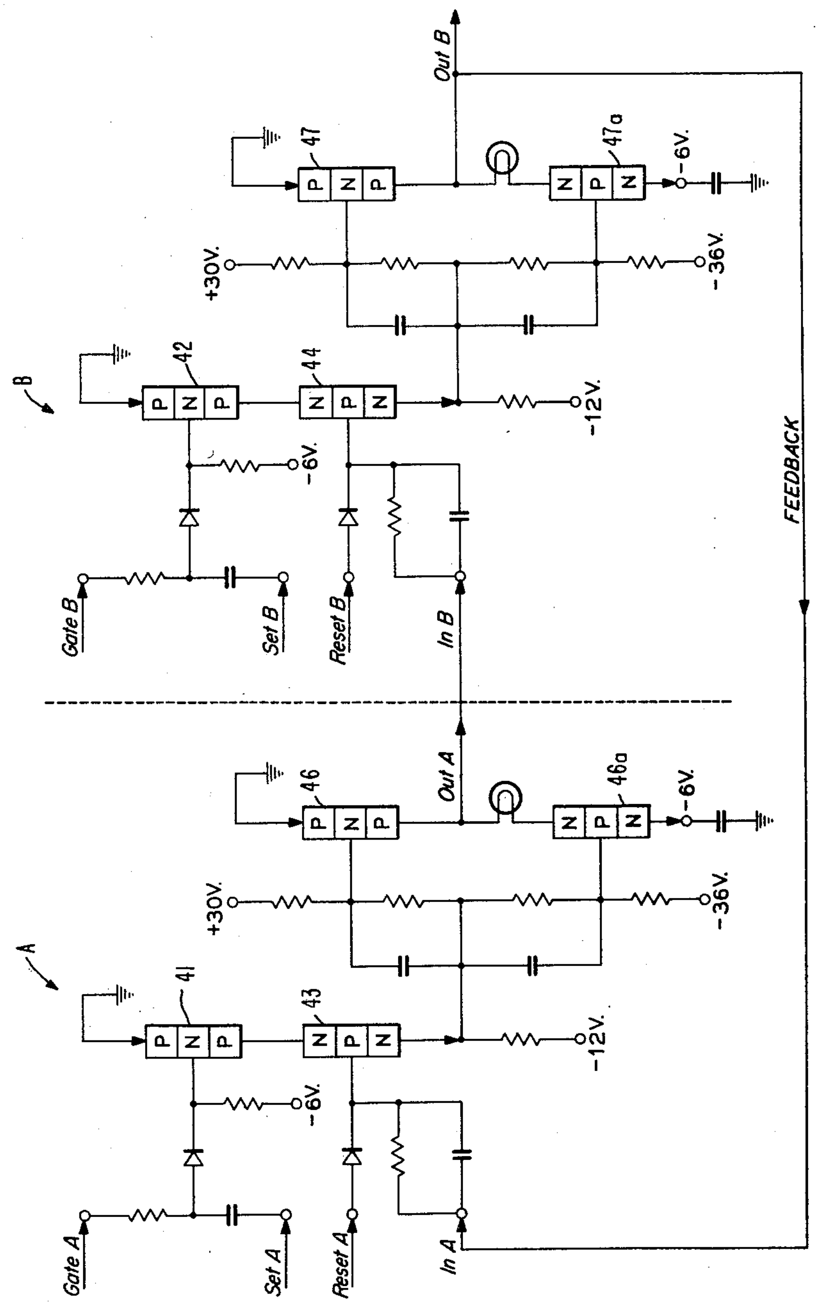
Figure 20:
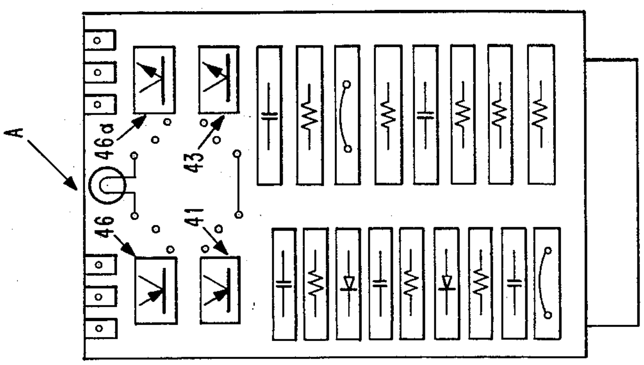
Figure 19:
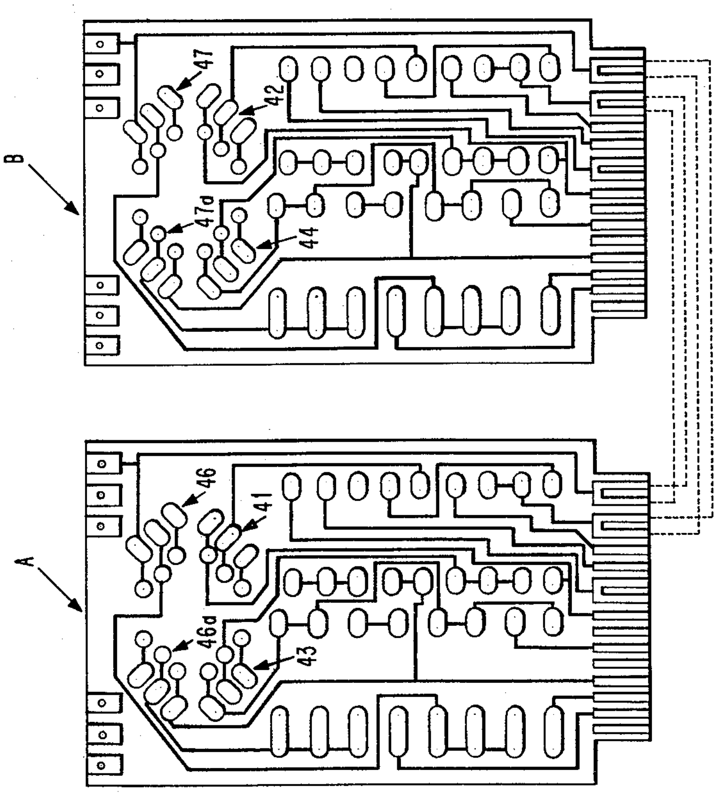

FIGS. 4*a*, 4*b* and 4*c* are schematic views to illustrate the deflection of the contact elements upon insertion of a pluggable element;

FIG. 5 is a fragmentary top plan view of the receptacle to show the contact elements in their normal position;

FIG. 6 is a sectional view taken on the line 6—6 in FIG. 5;

FIGS. 7*a* and 7*b* are detail views of the contact elements;

FIG. 8 is a bottom plan view of the panel having printed circuitry for electrically interconnecting the contact elements;

FIG. 9 is a side elevation view of the guide and separator elements;

FIG. 10 is a front elevation view showing laterally adjacent supported receptacles with associated guide and separator elements and accommodating pluggable elements;

FIG. 11 is a side elevation view showing longitudinally adjacent receptacles with electrical interconnections between the contact elements of the adjacent receptacles;

FIG. 12 is a fragmentary front elevation view showing longitudinally and laterally adjacent receptacles mounted upon the supporting structure shown in a position to permit removal of the upper right receptacle;

FIG. 13 is a fragmentary side elevation view of the supporting structure for the receptacles;

FIG. 14 sheet 3 is a fragmentary top plan view of the receptacle with the pluggable element in section where the pluggable element is grooved between the terminals to permit the same to enter into the area between the separators of the receptacle;

FIG. 14*a* is a side elevational view where the pluggable element is grooved between the terminals;

FIG. 15 is an isometric view of a typical pluggable element with electronic components mounted thereon;

FIG. 16 is an isometric view of a jumper cable having printed conductors which is adapted to plug into the receptacles to electrically interconnect the contact elements thereof;

FIG. 17 is a front elevation view of a pluggable element having terminals connected to conductors of a cable;

FIG. 18 is a schematic representation of a trigger circuit having stages A and B;

FIG. 19 is a schematic representation of the thin conductors adherent to two pluggable elements, each one containing one half or a stage of the trigger circuit of FIG. 18 with the interconnections between the terminals of the pluggable elements shown by dashed lines; and, FIG. 20 is a schematic representation of the electronic components mounted on the pluggable element of stage A of the trigger circuit of FIG. 18; stage B has identical electronic components.

Figure 1:
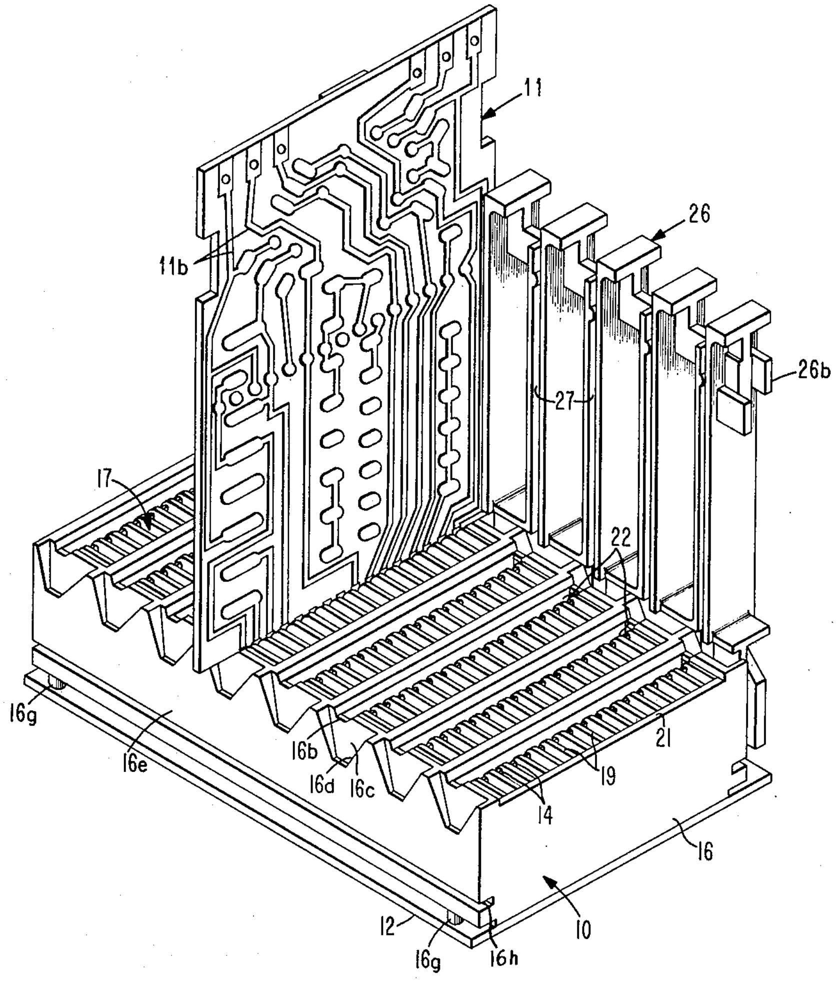
FIG. 1 is an isometric view showing a receptacle and attached guide and separator element with a pluggable element in the receptacle.
Figure 3:
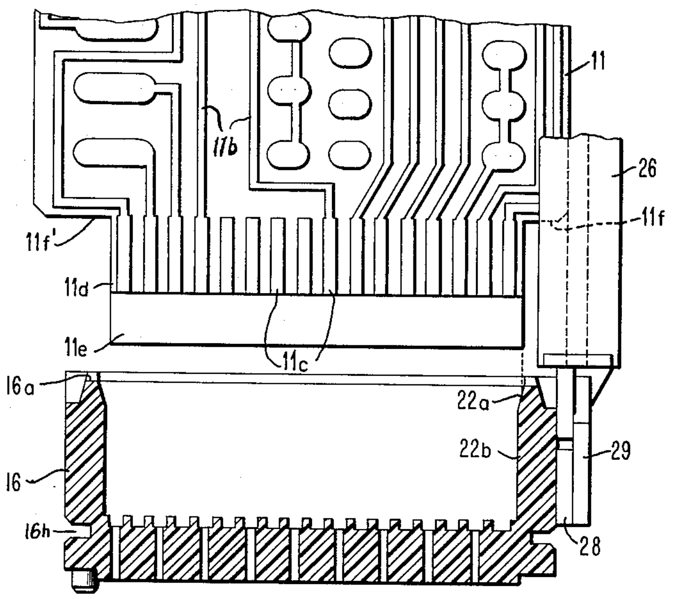
FIG. 3 is a vertical section view of the receptacle and shows a pluggable element being guided into the receptacle by the guide and separator element.

With reference to the drawings and particularly to FIG. 1, the invention is shown, by way of example, with a receptacle 10 having contact elements 14 for receiving pluggable elements 11 provided with electronic components, FIG. 15, electrically connected by printed wiring **11*b* to terminals 11*c*, FIGS. 1 and 3, which are adapted to engage the contact elements 14. The receptacle 10, FIG. 1, is attached to a panel 12 having apertures 13, FIG. 8, therein corresponding to the contact elements 14 which are adapted to extend therethrough and be electrically interconnected by printed wiring 12*a* adherent to the panel 12**.

The receptacle 10 has a body or block 16, FIGS. 1 and 3, for receiving the pluggable elements 11 and containing the resilient contact elements 14 made from any suitable material, such as, for example, Phosphor bronze. The contact elements 14 are of two different configurations, **14*a* and 14*b*, respectively, which have identical terminal portions 14*c*; but, intermediate the ends thereof, terminals 14*a* and 14*b*** have the configuration as shown in FIGS. 7*a* and 7*b*, respectively. In this manner, the contact elements **14*a* and 14*b*, FIG. 6, are permitted to reside in partitioned cavities 17 in the block 16 so that the compound curved contact projections 14*d* of the contact elements 14*a* and 14*b* are coplanar and the terminal portions 14*c* of the contact elements 14 are spaced from each other, as shown in FIGS. 6 and 8, thereby forming a grid-like pattern and increasing the space between terminals to permit attachment of wire cable connections 18, as seen in FIG. 11. Separators 19 integral with and extending inwardly into the cavities 17 at right angles from walls 21 of the block 16 separate the contacts 14*a* and 14*b***, FIGS. 1 and 5.

Grooves or pathways 22 are formed between the inner edge **19*a* of the separators 19 and walls 23 of the block 16, FIG. 6. Each groove 22 extends vertically downward from the upper edge 23*a* of the wall 23 to a base section 24 integral with and disposed between the separators 19 and the walls 21 and 23. The compound curved projection 14*d* of the contact elements 14 lies within the grooves 22 while serpentine portions 14*e* of the terminals 14 avoid the groove 22, as in FIG. 6. The portions 14*c* of the contact elements 14 extend from the base section 24 in two uniformly spaced offset or staggered rows parallel to and inward from the walls 21 and 23. A lower ledge 24*a* is provided in the base section 24 between the separations 19 to furnish a locating or datum plane for the contact elements 14*a* and 14*b***, as shown in FIG. 6.

Each of the contact elements 14 has dimple-formed protuberances **14*f* which are intended to bite into the base section 24 upon insertion into channel 24*b*, as shown in FIG. 6, whereby the contact elements 14 become firmly anchored in the base 24. The contact elements 14 are so formed or stressed that, upon being anchored in the base section 24, the compound curved projections 14*d* bear against the walls 23 with considerable pressure. The compound curved projections 14*d* provide for good electrical contact with the terminals 11*c*. The compound curved projections 14*d* may be formed by punch and die during the forming of the contact elements or stock material may be drawn with a compound curved portion running the length thereof so that, upon forming the contact elements 14, the compound curved projection 14*d* is automatically formed. The contact elements 14 and the terminals 11*c*** are preferably plated with a precious metal, such as gold or the like, in order to reduce electrical contact resistance.

Upon insertion of one of the pluggable elements 11, the portion of the contact elements 14 within the associated groove 22 is forced rearward or toward the wall 21; but, being resilient, the contacts maintain constant pressure against the pluggable element to wipe the terminals **11*c* and remove any oxidation or foreign matter which may have formed upon either the contact elements 14 or the terminals 11*c***.

The pressure exerted by the contact elements 14 against the terminals **11*c* upon the pluggable elements 11 is quite critical in regard to the quality of the electrical connection thereby established. Because of this fact, the contact elements 14 are so configured that they uniformly exert high mechanical pressure upon the terminals 11*c* of the pluggable elements 11. In order for the contact elements 11 to apply uniform pressure against the terminals 11*c*, it is necessary that they be not overstressed. If the contact elements 14 are overstressed, they will not only exert a different degree of pressure upon the terminals 11*c* each time a pluggable element 11 is inserted, but, after several insertions of the pluggable units, it is highly probable that the contact elements 14 would fail to establish an adequate electrical connection with the terminals 11*c***. The possibility of overstressing the contact elements is quite high in instances where pressure is immediately placed upon the contact elements when inserting the pluggable elements.

The grooves 22 aid in preventing overstressment of the contact elements 14. The width of the grooves 22 is held to a very close tolerance; and the pluggable elements 11, which will be described in greater detail later herein, have a portion **11*g* machined on the side containing the electronic components 11*a*, FIG. 15, which is opposite of the terminals 11*c*, so as to establish a very precise distance from that side to the contacting surface of the terminals 11*c*. In this manner, the portion of the contact elements in the grooves 22 will be urged rearward into the area between the separators 19 a controlled amount which does not permit overstressing of the contact elements 14**.

The pluggable elements 11, which have electronic components **11*a* (there are pluggable elements without electronic components adapted for use with the receptacle 10), are all of the same size and are made of a di-electric material of a thickness substantially equal to the width of the grooves 22. The general outline of the pluggable elements is rectangular; and the electronic components 11*a* are carried on one side while the circuitry 11*b* for interconnecting these components is contained on the other side, as shown in FIGS. 1, 3, and 15. The circuitry 11*b* extends along the length of the pluggable element 11 to terminate at the terminals 11*c* which are parallel to each other and positioned upon a tongue member 11*d* of the pluggable element. The tongue member 11*d* is integral with and asymmetrical to the pluggable element 11**.

Because the tongue member **11*d* is asymmetrical with the pluggable element 11, as will be seen later herein, the pluggable element may be inserted only one way into the receptacle. The terminals 11*c* may extend the entire length of the tongue member 11*d* or terminate at the edge of a beveled surface 11*e* sloping upwardly from the edge 11*f* of the tongue toward, but not to, the juncture of the tongue with the remainder portion of the pluggable element 11**. It is preferable that the beveled surface be free of the terminals because it has a lower co-efficient of friction. Hence, there will be less wear on the contact elements 14 while they are being deflected. The beveled surface 11*e* on the tongue 11*d* permits gradual loading on the contact elements 14 upon insertion of the pluggable elements 11 and thereby further reduces the possibility of overstressing the contact elements. As the beveled surface 11*e* engages the contact elements 14 at the portion 14*d*, FIG. 4*a*, it linearly deflects the contact elements 14 rearward toward the wall 21, FIG. 4*b*. The contact elements 14 are substantially fully deflected, FIG. 4*c*, upon engagement with the terminals 11*c*. The work performed while further inserting the pluggable element 11 into the receptacle 10 is solely the work necessary to overcome the friction forces of the contact elements 14 and the terminals 11*c*.

Figure 2:
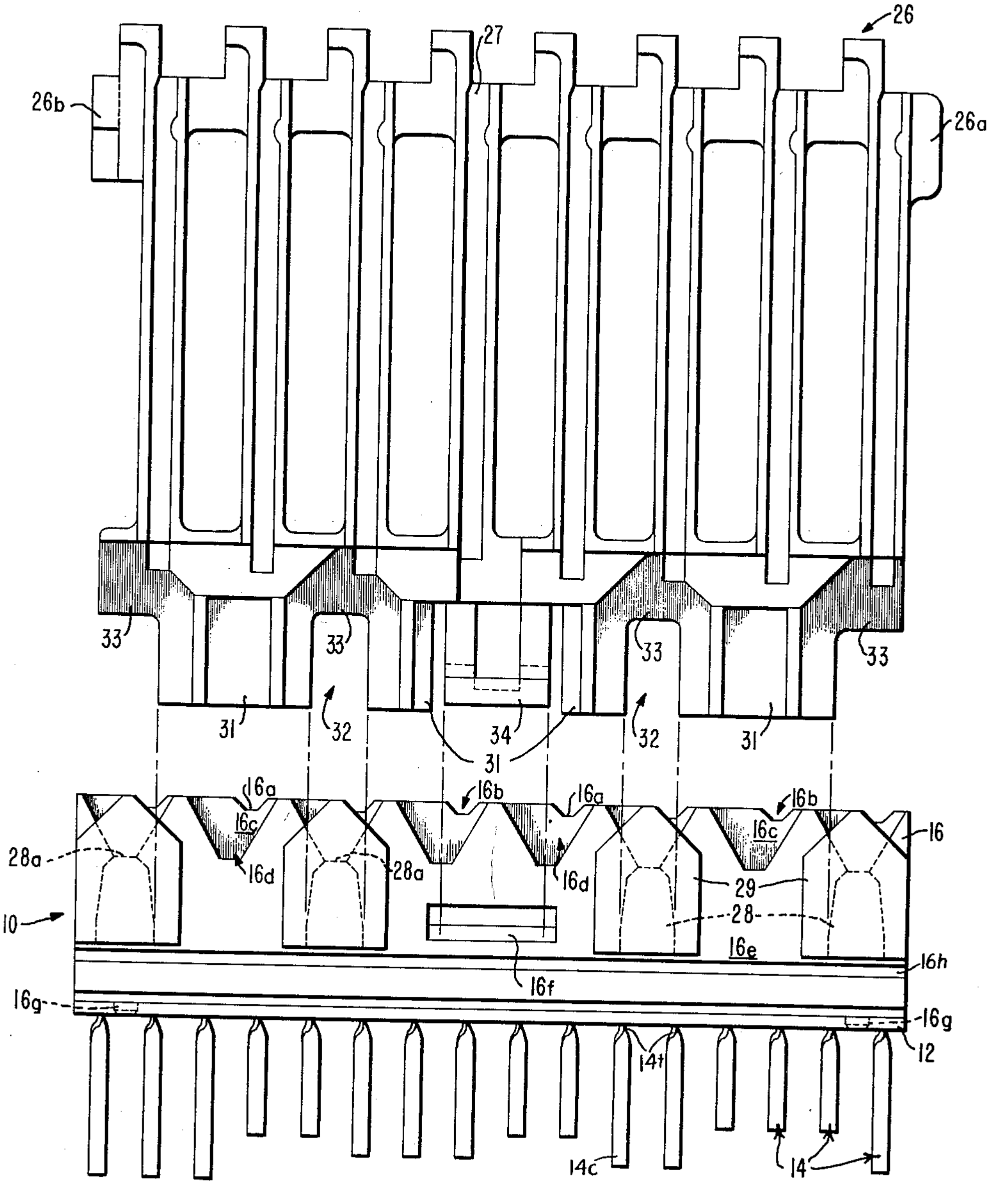
FIG. 2 is a side elevation view of the receptacle with the guide and separator element disposed above and detached therefrom.

The shoulders 11*f* and 11*f'*, FIGS. 3 and 15, formed by the tongue member 11*d*, are adapted to engage ledges 16*a* of tapered notches 16*b*, FIGS. 1 and 2, in the end faces 16*c* of outwardly opening V-shaped notches 16*d* in the sides 16*e* of the receptacle block 16 so as to limit the depth of insertion of the pluggable elements 11 into the grooves 22. The V-notches 16*d* serve to locate the receptacle block 16 in cooperation with a detent element, not shown, to facilitate insertion of the contact elements 14 during assembly of the receptacle 10.

While the terminals 11*c* minutely extend into the space formed between adjacent separators 19, the tongue member 11*d* may be of greater caliper than the width of the grooves 22 and grooved to form a groove 11*i* between terminals 11*c*, FIG. 14, and machined on the side opposite of the terminals 11*c* to be approximately equal to the width of the grooves 22 so that the terminals 11*c* lie well into the space between the separators 19 which then form a shield for the terminals 11*c*.

Since the terminals 11*c* reside upon only one side of the tongue 11*d*, it is highly desirable to insure that the pluggable elements 11 will be inserted into the receptacle so that the terminals 11*c* will establish electrical connections with the contact elements 14. A detachable guide and separator element 26, FIGS. 1, 2 and 3, is so mounted on the receptacle 10 that the pluggable elements 11 may be inserted into the grooves 22 in one way only; i.e., with the terminals 11*c* engaging the contact elements 14. If an attempt is made to insert the pluggable elements 11 backwards into the receptacle 10, the unequal length of shoulders 11*f* and 11*f'* will cause the tongue member 11*d* to engage the ledge 16*a* and be prevented from entering the groove 22. The tongue member 11*d*, when the pluggable element is inserted correctly into the receptacle 10, is clear of the ledge 16*a*, as shown in FIG. 3.

The guide and separator element 26, FIGS. 1 and 2, has longitudinal guideways 27 corresponding to the grooves 22 of the receptacle 10 and is adapted to be secured thereto so that the guideways 27 open outwardly to the side and in register with the grooves 22. Longitudinally spaced retaining elements 28, FIGS. 2 and 3, with flanges 29 fixed to the faces and extending beyond the sides thereof, project from the side 16*e* of the receptacle block 16 to be embraced by longitudinally extending vertical frame members 31 of wickets 32 integral with the guide and separator element 26 so that the frame members 31 lie between the flanges 29 and the adjacent receptacle side 16*e*. A horizontal cross-tie 33, FIG. 2, for the frame members 31 is adapted to seat upon the upper edge 28*a* of the retaining elements 28. A resilient latch 34, longitudinally extending from and integral with the guide and separator element 26, is centrally located along the length thereof to extend in the same direction as the wickets 32 and has outwardly projecting retaining lugs 35, FIG. 9, which are adapted to be received by a recess 16*f*, FIG. 2, centrally located in the side 16*e* of the receptacle 16 and between the retaining elements 28.

The guide and separator element 26 may be attached to the receptacle manually by sliding the frame members 31 between the flanges 29 and the side 16*e* of the receptacle 16 so as to embrace the projecting retaining elements 28. As the cross-ties 33 of the frame members 31 seat upon the edges 28*a* of the retaining elements 28, the lugs 35 of the latch 34 enter the recess 16*f* to lock the guide and separator element 26 with the receptacle 10.

The guide and separator element 26 facilitates insertion of the pluggable elements 11, as well as to separate the same, and hold the free portion thereof rigid after they are fully inserted into the receptacle 10. As the pluggable element 11, FIG. 3, is moved along one of the guideways 27 toward the receptacle 10, the tongue member 11*d* engages an inclined surface 22*a* formed along the upper edge of the pathway sidewall 22*b*; and, upon further movement of the pluggable element, the same is shifted laterally into the pathway 22 to permit insertion therein. It will be remembered that, if by inadvertence, an attempt is made to insert the pluggable element backwards into the receptacle; i.e., so that the contact elements 14 will not establish an electrical connection with the terminals 11*c*, the tongue member 11*d* engages the ledges 16*a* and is thereby prevented from entering one of the grooves 22.

The receptacles 10 are of uniform width but may be of different lengths depending upon the number of grooves 22 to a receptacle 10. For example, a receptacle 10 having eight grooves with 256 contact elements 14 is shown in FIGS. 1 and 8. The contact elements 14 residing in one partitioned cavity 17 may be electrically interconnected with contact elements 14 of another partitioned cavity 17. These electrical connections may be established in several ways; for example, by the conductors 12*a* upon the panel 12 or by the cable connections 18, FIGS. 8 and 11. However, regardless of which type of electrical connection is used, it is desirable to utilize the panel 12 of di-electric material having the plurality of apertures 13 formed in a pattern corresponding to the manner in which the contact elements 14 extend from the receptacle 10. The panel 12, FIGS. 8 and 10, located with respect to the receptacle by a pin 16*g* extending from receptacle block 16 into a hole 12*b* in the panel 12, is held to the receptacle 10 by twisting the extending portions 14*c*, of the contact elements 14, 90 degrees to form a twist 14*t*, as shown in FIG. 10, and by making a solder fillet connection 15, FIGS. 11 and 13, between the extending terminal portion 14*c* and a metallic ring 12*c* encompassing each aperture 13 and bonded to the panel 12. The metallic ring 12*c*, as well as the interconnecting circuitry 12*a*, FIG. 8, may be formed upon the panel by well-known printed circuit techniques. In the event the contact elements 14 are interconnected in some instances by the conductors 12*a* and in others by the cables 18, the extending portions 14*c*, connected to conductors 12*a* only, may be clipped at the soldered connection, as shown in FIG. 11.

It is thus seen that, aside from facilitating the establishment of electrical interconnections by the conductors 12*a*, the panel 12 aids in rigidizing the extending contact element portions 14*c* to permit the electrical cable connections 18, FIG. 11, by wrapping wire therearound; in this example, three separate wire wrap connections may be made to a single contact element. Of course, a multiplicity of panels 12 with printed circuitry 12*a* thereon could be utilized for establishing the desired electrical interconnections.

While several receptacles 10 could be electrically connected by a common panel 12, it is more desirable to have a separate panel 12 for each receptacle to facilitate servicing and replacement thereof. The receptacles 10 may be interconnected by means of a jumper cable 36, FIG. 16, made of a flexible flat plastic ribbon 36 having thin conductors 36*a* adherent thereto. The cable at each end may be folded over a thin panel 36*b* and secured therearound by a plastic band 31*c* to permit the so formed assembly to enter the grooves 22 of the receptacles 10. The panel 36b extends beyond the folded portion to serve as a grip for inserting the cable 36 into the receptacles.

External cable connections may be made with the contact elements 14 in addition to wire wrap connections. Leads 37a from an electrical cable 37, FIG. 16, may be threaded through apertures 11h communicating with the terminals 11c on the tongue member 11d of a pluggable element 11. The leads 37a are then soldered with a fillet 37b to the terminals 11c to establish electrical connections therewith. The pluggable element 11 may then be inserted into one of the grooves 22 to establish electrical connections with the associated contact elements 14 which are electrically connected; for example, by printed circuitry 12a on the panel 12; to contact elements 14 of another groove 22 electrically connected with the terminals 11c of a pluggable element 11 having electronic components mounted thereon.

In order to facilitate servicing and replacement of the receptacles 10, they are mounted between parallel spaced T-shaped rails 38, FIGS. 10, 12 and 13, extending between spaced vertical frame members 39 and secured thereto by thumbscrews 40 which pass through holes 38a in the rails 38 to threadedly engage the frame members 39. The flanges 38b and 38c of the T-rails 38 are adapted to lie in outwardly opening longitudinal grooves 16h provided in the sides of the receptacle body 16 to thereby support and laterally space the receptacles 10 from each other. The flange 38c is wider than the flange 38b so as to accommodate the guide and separator element, as seen in FIG. 10. To remove a receptacle 10, FIG. 12, bounded by adjacent receptacles, the thumbscrews 40 are removed to permit one of the T-rails 38 to be withdrawn longitudinally so that the flanges 38b and 38c, engaged in the associated longitudinal grooves 16h in the body 16 of the receptacle 10 being removed, and the laterally adjacent receptacle disengage from the associated grooves 16h. The receptacle 10 may then be shifted laterally so as to disengage from the flange 38c of the non-withdrawn T-rail 38 and thereby become free of the supporting structure. However, it should be pointed out that the guide and separator element 26 has male and female slidably interfitting connecting elements 26a and 26b, respectively, projecting longitudinally outward from the ends thereof, as shown in FIGS. 2 and 12. In this manner, longitudinally adjacent receptacles 10 are also supported by means of the guide and separator elements 26, FIG. 12, even though one of the T-rails 38 is withdrawn to permit removal of a receptacle 10. Since the guide and separator elements 26 have connecting elements 26a and 26b which interfit with each other, it is necessary to first remove the guide and separator element 26 from the receptacle 10 being removed before shifting the same laterally to free it of the supporting structure. Also, as it was pointed out previously, each guide and separator element has parallel guideways 27 disposed back to back so as to service laterally adjacent receptacles 10, as seen in FIG. 10.

From the foregoing, it is seen that the receptacle 10 facilitates electrical interconnections between the terminals 11c of one pluggable element 11 with the terminals of another pluggable element. Two pluggable elements 11, FIG. 19, for example, may each contain electronic components, as in FIG. 20, and circuitry for one half of a two stage trigger, FIG. 18, with the halves A and B of the trigger each comprising gate and set input inverters 41 and 42, reset and cross-coupling emitter followers 43 and 44, and complemented inverter output drivers 46, 46a, 47, and 47a, respectively. The outputs of the complemented inverter output drivers 46, 46a, 47, and 47a are connected to the inputs of the cross-coupling emitter followers 44 and 43, respectively. The electronic components, as in FIG. 19c, for halves A and B of the trigger are mounted on the pluggable elements and interconnected by the thin conductors adherent to the pluggable elements, as shown in FIGS. 19a, 19b, and 19c. The terminals of the pluggable element 11 for trigger half A to be connected to the terminals of the pluggable element 11 for trigger half B, as shown by the dashed lines in FIGS. 19a and 19c, are connected by means of the contact elements 14 of the receptacle 10 which may be interconnected by conductors 12a adherent to panel 12 or by cable connections 18.

Operation of the trigger is described in detail in the application of Genung L. Clapper, Serial No. 735,230, filed May 14, 1958, now Patent No. 2,951,952.

It is thus seen that the pluggable elements 11 are interconnected through the facilities of the receptacle 10 to perform particular functions in a particular manner to effect some useful device.

Further, it is seen from above that the receptacles for the pluggable elements, an improvement over prior art devices, may be included in an assembly which can be assembled and serviced quickly and inexpensively.

Also, it is seen from the foregoing that the receptacles have been provided with guide elements which function to guide the pluggable elements during insertion into the receptacles and hold the free portion of the pluggable elements rigid and separate as well as cooperating to prevent backward insertion of the pluggable elements.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

I claim:

1. An assembly comprising: a receptacle having a floored cavity with opposite side and end walls, separators extending from one of the side walls and terminating short of the opposite side wall to provide a longitudinal groove, stressed contact elements fixed within said receptacle and having a contact portion normally projecting beyond the separators toward said opposite side wall, and a pluggable element having a tongue member with spaced terminals thereon with recessed sections therebetween adapted to be inserted in said longitudinal groove with said terminals engaging said contact portion of the contact elements and with the recessed sections engaging said separators whereby the contact portions of each contact element are simultaneously displaced away from said opposite side wall to lie between the separators.

2. An assembly comprising: a receptacle having a plurality of floored cavities with opposite side and end walls; a plurality of parallel spaced separators within each cavity extending from one of said opposite side walls and terminating short of the other of said opposite side walls to form a plurality of longitudinal grooves; contact elements having a first portion fixed relative to said receptacle so as to isolate against mechanical disturbances a second portion disposed between said separators and projecting into said longitudinal grooves from a third portion extending from said receptacle in a staggered pattern; at least two pluggable elements each insertable into one of said plurality of longitudinal grooves, said pluggable elements each having a projecting tongue with a tapered forward section adapted to engage said second portion of said contact elements to simultaneously displace the same from said longitudinal grooves; terminal elements carried by said tongue for engaging said displaced second portion of said contact elements to establish electrical contact therewith; a di-electric panel having apertures arranged to correspond to said grid pattern secured to the receptacle with the third portion of said contact elements extending through said apertures; and conductors adherent to said di-electric panel for selectively electrically interconnecting the contact elements electrically contacting said terminals of one pluggable element with the contact elements electrically contacting said terminals of another pluggable element.

3. An assembly comprising: a plurality of adjacent receptacles having at least a pair of opposite sides provided with longitudinal grooves, each receptacle provided with a walled cavity for receiving a pluggable element; support elements for engaging the longitudinal grooves in said opposite sides of said adjacent receptacles to support the same; and pluggable element guide members attached to each of said plurality of receptacles, said guide members having mating support elements interfitting with each other to support the receptacles to permit removal of one of said plurality of receptacles upon withdrawal of one of said support elements from the longitudinal grooves of adjacent receptacles.

References Cited in the file of this patent

UNITED STATES PATENTS

| | | |
|---|---|---|
| 771,510 | Thomas et al. | Oct. 4, 1904 |
| 1,496,817 | Mather | June 10, 1924 |
| 1,841,736 | Jones | Jan. 19, 1932 |
| 2,011,861 | Knumann | Aug. 20, 1935 |
| 2,056,361 | Mills | Oct. 6, 1936 |
| 2,189,874 | Ziganke | Feb. 13, 1940 |
| 2,200,332 | Henning | May 14, 1940 |
| 2,510,944 | Auerbach | June 13, 1950 |
| 2,597,338 | Kohring | May 20, 1952 |
| 2,659,874 | Veitch | Nov. 17, 1953 |
| 2,692,305 | Mullin | Oct. 19, 1954 |
| 2,699,534 | Klostermann | Jan. 11, 1955 |
| 2,724,095 | Rudner | Nov. 15, 1955 |
| 2,740,944 | Harrison et al. | Apr. 3, 1956 |
| 2,748,321 | Kamm | May 29, 1956 |
| 2,748,364 | Kamm | May 29, 1956 |
| 2,765,450 | Richardson | Oct. 2, 1956 |
| 2,780,791 | Morschel | Feb. 5, 1957 |
| 2,807,790 | Del Camp | Sept. 24, 1957 |
| 2,832,013 | Pedersen et al. | Apr. 22, 1958 |
| 2,841,660 | Tabet | July 1, 1958 |
| 2,855,579 | Wintriss | Oct. 7, 1958 |
| 2,858,515 | Thunander et al. | Oct. 28, 1958 |
| 2,881,404 | Kamm | Apr. 7, 1959 |
| 2,891,229 | Flanagan | June 16, 1959 |
| 2,911,609 | Burtt et al. | Nov. 3, 1959 |
| 2,916,721 | Adams | Dec. 8, 1959 |
| 2,928,066 | Gordon | Mar. 8, 1960 |
| 2,929,042 | Guttridge et al. | Mar. 15, 1960 |
| 2,938,187 | Broderick et al. | May 24, 1960 |
| 2,946,033 | Wirth | July 19, 1960 |

FOREIGN PATENTS

| | | |
|---|---|---|
| 203,624 | Australia | Oct. 10, 1956 |
| 796,345 | Great Britain | June 11, 1958 |

OTHER REFERENCES

Buggie EC Series, January 8, 1954, page 3.

Scal Proc. I.R.E., January 1955, page 6.

G. T. Electronic Design, January 8, 1958, page 53.